(12) United States Patent
Okuno et al.

(10) Patent No.: US 12,358,828 B2
(45) Date of Patent: Jul. 15, 2025

(54) GLASS PLATE MANUFACTURING METHOD

(71) Applicant: Nippon Electric Glass Co., Ltd., Shiga (JP)

(72) Inventors: Tsuyoshi Okuno, Shiga (JP); Hisatoshi Aiba, Shiga (JP); Takahide Fujii, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 257 days.

(21) Appl. No.: 17/789,897

(22) PCT Filed: Jan. 12, 2021

(86) PCT No.: PCT/JP2021/000702
§ 371 (c)(1),
(2) Date: Jun. 29, 2022

(87) PCT Pub. No.: WO2021/157291
PCT Pub. Date: Aug. 12, 2021

(65) Prior Publication Data
US 2023/0068194 A1 Mar. 2, 2023

(30) Foreign Application Priority Data

Feb. 6, 2020 (JP) .................................. 2020-018866

(51) Int. Cl.
*C03B 33/02* (2006.01)
*C03B 33/037* (2006.01)
(52) U.S. Cl.
CPC ........ *C03B 33/0222* (2013.01); *C03B 33/037* (2013.01)

(58) Field of Classification Search
None
See application file for complete search history.

(56) References Cited

U.S. PATENT DOCUMENTS

2007/0284785 A1* 12/2007 Hoekstra ............. B23K 26/142
425/142
2008/0061043 A1 3/2008 Fujii
2011/0127242 A1 6/2011 Li
(Continued)

FOREIGN PATENT DOCUMENTS

JP 2001-293586 10/2001
JP 2008-49498 3/2008
(Continued)

OTHER PUBLICATIONS

International Preliminary Report on Patentability and Written Opinion of the International Searching Authority issued Jul. 28, 2022 in corresponding International (PCT) Patent Application No. PCT/JP2021/000702.
(Continued)

*Primary Examiner* — Lisa L Herring
(74) *Attorney, Agent, or Firm* — Wenderoth, Lind & Ponack, L.L.P.

(57) ABSTRACT

This method includes a laser irradiation step of radiating, in at least a part of a preset cleaving line (CL) of a mother glass sheet (MG), laser light (L) to a position (OSP) separated from the preset cleaving line (CL) so that a crack (CR2) propagates along the preset cleaving line (CL).

4 Claims, 9 Drawing Sheets

(56) References Cited

U.S. PATENT DOCUMENTS

| | | | |
|---|---|---|---|
| 2014/0084040 A1* | 3/2014 | Zhang | C03B 33/033 225/93 |
| 2015/0191388 A1 | 7/2015 | Abramov et al. | |
| 2015/0209898 A1* | 7/2015 | Kim | B23K 26/0006 65/355 |
| 2017/0369357 A1* | 12/2017 | Vogt | C03B 33/0235 |
| 2018/0057390 A1* | 3/2018 | Hackert | C03C 3/093 |
| 2021/0387288 A1* | 12/2021 | Hoehm | C03B 33/091 |
| 2022/0135463 A1* | 5/2022 | Li | B23K 26/38 225/93 |
| 2022/0315472 A1* | 10/2022 | Kanno | B23K 26/0006 |

FOREIGN PATENT DOCUMENTS

| | | |
|---|---|---|
| JP | 2010-229005 | 10/2010 |
| JP | 2011-116611 | 6/2011 |
| JP | 2016-691 | 1/2016 |
| KR | 10-2016-0107227 | 9/2016 |
| WO | 2006/038565 | 4/2006 |

OTHER PUBLICATIONS

International Search Report issued Mar. 16, 2021 in corresponding International Application No. PCT/JP2021/000702.

Request for the Submission of an Opinion issued Sep. 20, 2024 in corresponding Korean Patent Application No. 10-2022-7015829 with English translation.

* cited by examiner

GLASS PLATE MANUFACTURING METHOD

TECHNICAL FIELD

The present invention relates to a method of manufacturing a glass sheet having a predetermined shape by cleaving a mother glass sheet through irradiation with laser light.

BACKGROUND ART

As is well known, various glass sheets to be used for panel displays, such as a liquid crystal display and an OLED display, OLED lighting, a solar cell panel, and the like are each formed into a predetermined shape through the step of cutting a mother glass sheet.

For example, in Patent Literature 1, there is disclosed laser cleaving as a technology of cutting a mother glass sheet. In this laser cleaving, first, an initial crack is formed on a mother glass sheet (glass film having a thickness of 0.2 mm or less) with a crack former, such as a diamond cutter. Next, the mother glass sheet is heated through irradiation with laser light along a preset cleaving line set on the mother glass sheet, and the heated portion is cooled by a refrigerant, such as cooling water, jetted from a cooling unit. With this result, a thermal shock (thermal stress) is generated in the mother glass sheet, and a crack is caused to propagate along the preset cleaving line (preset cutting line) through use of the initial crack as a starting point. Thus, the mother glass sheet can be cut.

CITATION LIST

Patent Literature 1: JP 2011-116611 A

SUMMARY OF INVENTION

Technical Problem

In the laser cleaving according to Patent Literature 1, a $CO_2$ laser is used, and hence only a surface layer of the mother glass sheet is heated. Consequently, a glass film having a thickness of 0.2 mm or less is targeted. When an attempt is made to cleave a mother glass sheet having a thickness of more than 0.2 mm by the laser cleaving according to Patent Literature 1, apart in a thickness direction cannot be cleaved, and the step of applying a bending stress to the mother glass sheet to fold and separate the mother glass sheet may be required in some cases.

When, for example, a CO laser is used instead of the $CO_2$ laser, an inner portion as well as the surface layer of the mother glass sheet can be heated. Accordingly, while the crack is caused to propagate along the preset cleaving line through the thermal shock caused by the heating, the crack can also be caused to propagate in the thickness direction of the mother glass sheet.

However, in the case where the inner portion as well as the surface layer of the mother glass sheet is heated through irradiation with laser light, the crack does not propagate along the preset cleaving line in some cases even when the laser light is scanned along the preset cleaving line. In those cases, it becomes difficult to accurately cut the glass sheet.

The present invention has been made in view of the above-mentioned circumstances, and a technical object of the present invention is to accurately cleave a mother glass sheet with laser light.

Solution to Problem

In order to achieve the above-mentioned object, according to one embodiment of the present invention, there is provided a method of manufacturing a glass sheet, comprising: an initial crack forming step of forming an initial crack on a mother glass sheet; and a laser irradiation step of irradiating the mother glass sheet with laser light to cause a crack to propagate along a preset cleaving line through use of the initial crack as a starting point and cause the crack to propagate in a thickness direction of the mother glass sheet, to thereby cleave the mother glass sheet into a first glass sheet and a second glass sheet, wherein the laser irradiation step comprises radiating, in at least a part of the preset cleaving line, the laser light to a position separated from the preset cleaving line so that the crack propagates along the preset cleaving line.

With this configuration, the laser light is radiated to the position separated from the preset cleaving line without being radiated along the preset cleaving line, and thus the deviation amount of the crack from the preset cleaving line can be reduced. As a result, the mother glass sheet can be accurately cleaved.

In this method, a width of the first glass sheet may be larger than a width of the second glass sheet, and the laser irradiation step may comprise radiating, in a midway portion of the preset cleaving line, the laser light so as to be separated from the preset cleaving line on a side of a region of the mother glass sheet corresponding to the first glass sheet. With this configuration, the laser light is radiated to a region of the mother glass sheet on the side of the first glass sheet having a larger width, and thus the crack can be prevented from deviating from the preset cleaving line toward a second glass sheet side.

In this method, the mother glass sheet may have a rectangular shape, the preset cleaving line may be formed into a linear shape, and the laser irradiation step may comprise radiating the laser light to the mother glass sheet along a trajectory formed into a concave shape with respect to the preset cleaving line. With this configuration, the crack can be caused to accurately propagate throughout the entire length of the preset cleaving line.

This method may further comprise, before the laser irradiation step, a correction step of correcting a scanning trajectory of the laser light for the mother glass sheet, wherein the correction step comprises: a measurement step of measuring a change in propagation direction of the crack as a crack angle when the laser light is scanned so as to be separated from the preset cleaving line; and a corrected trajectory determination step of setting, based on the crack angle measured in the measurement step, a distance by which the laser light is separated from the preset cleaving line in the laser irradiation step.

With this configuration, the degree of deviation of the crack can be measured as the crack angle in the measurement step, and the scanning trajectory of the laser light can be corrected depending on the crack angle in the corrected trajectory determination step. When the laser light is scanned based on the separation distance between the laser light and the preset cleaving line set in the corrected trajectory determination step, the crack can be caused to accurately propagate along the preset cleaving line.

As the laser light, CO laser light may be used. The CO laser light can be stably radiated to the mother glass sheet with a high output, and hence can cause the crack to stably propagate along the preset cleaving line.

In the method of manufacturing a glass sheet according to the embodiment of the present invention, the laser irradiation step may be performed under a condition in which a thermal stress $\sigma_T$ (MPa) of the mother glass sheet calculated by the following mathematical expression 1 satisfies the following mathematical expression 2:

$$\sigma_T = \frac{E \cdot \alpha \cdot \Delta T}{2(1-v)} \quad [\text{Math. 1}]$$

where E represents a Young's modulus (MPa) of the mother glass sheet, α represents a thermal expansion coefficient (/K) of the mother glass sheet, ν represents a Poisson's ratio of the mother glass sheet, and ΔT represents a difference between a temperature (K) at an irradiation position of the laser light with respect to the mother glass sheet and a temperature (K) at a position away from the irradiation position; and $$40+60 \leq \sigma_T \leq 90+60t \quad [\text{Math. 2}]$$

where "t" represents a thickness (mm) of the mother glass sheet.

Advantageous Effects of Invention

According to the present invention, the mother glass sheet can be accurately cleaved with laser light.

DESCRIPTION OF EMBODIMENTS

Now, embodiments of the present invention are described with reference to the drawings. In each of FIG. 1 to FIG. 11, there is illustrated a method of manufacturing a glass sheet according to a first embodiment of the present invention.

This method comprises a cleaving step of cleaving a mother glass sheet MG through irradiation with laser light. The mother glass sheet MG is formed into a rectangular shape by cutting a glass ribbon, which is continuously formed into a band shape by a down-draw method, such as an overflow down-draw method, or a float method, in a width direction. The thickness of the mother glass sheet MG may be set to from 0.05 mm to 5 mm. The thickness of the mother glass sheet MG is preferably more than 0.1 mm, more preferably more than 0.2 mm, still more preferably 0.3 mm or more. Meanwhile, the thickness of the mother glass sheet MG is preferably set to 3 mm or less.

Examples of a material for the mother glass sheet MG include silicate glass, silica glass, borosilicate glass, soda glass, soda lime glass, aluminosilicate glass, and alkali-free glass. Here, the alkali-free glass refers to glass that is substantially free of an alkali component (alkali metal oxide), specifically glass having a weight ratio of the alkali component of 3,000 ppm or less. The weight ratio of the alkali component in the present invention is preferably 1,000 ppm or less, more preferably 500 ppm or less, most preferably 300 ppm or less. The mother glass sheet MG may be chemically strengthened glass, and in this case, aluminosilicate glass may be used.

Figure 1:
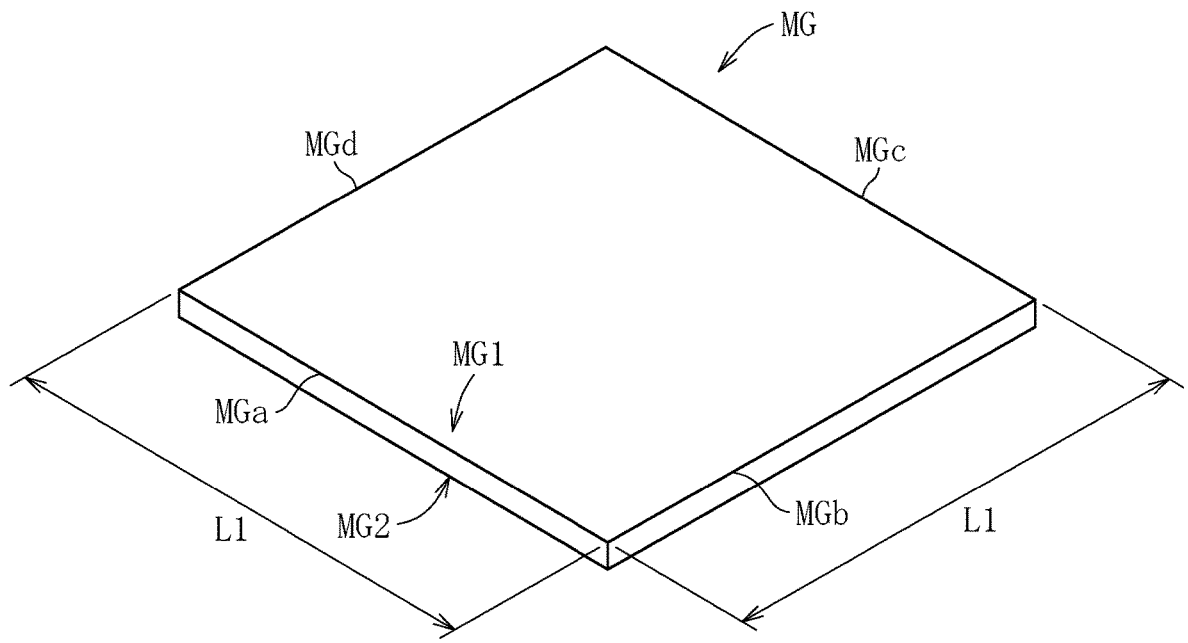
FIG. 1 is a perspective view of a mother glass sheet.

As illustrated in FIG. 1, the mother glass sheet MG comprises a first surface MG1, a second surface MG2, and an edge portion comprising a first side MGa to a fourth side MGd. In this embodiment, the mother glass sheet MG having a square shape in which the sides MGa to MGd each have a length dimension of L1 is given as an example, but the shape and dimensions of the mother glass sheet MG are not limited to this embodiment.

In the cleaving step, there are the following cases, depending on a cutting position of the mother glass sheet MG: the case in which correction of a scanning trajectory (preset scanning line) of the laser light is required in advance; and the case in which the mother glass sheet MG can be cut without correction of the scanning trajectory.

First, the case in which the mother glass sheet MG is cleaved without correction of the scanning trajectory of the laser light is described.

The cleaving step comprises: an initial crack forming step of forming an initial crack on the surface of the mother glass sheet MG; and a laser irradiation step of causing a crack to propagate along a preset cleaving line through use of the initial crack as a starting point and causing the crack to propagate in a thickness direction of the mother glass sheet MG.

Figure 2:
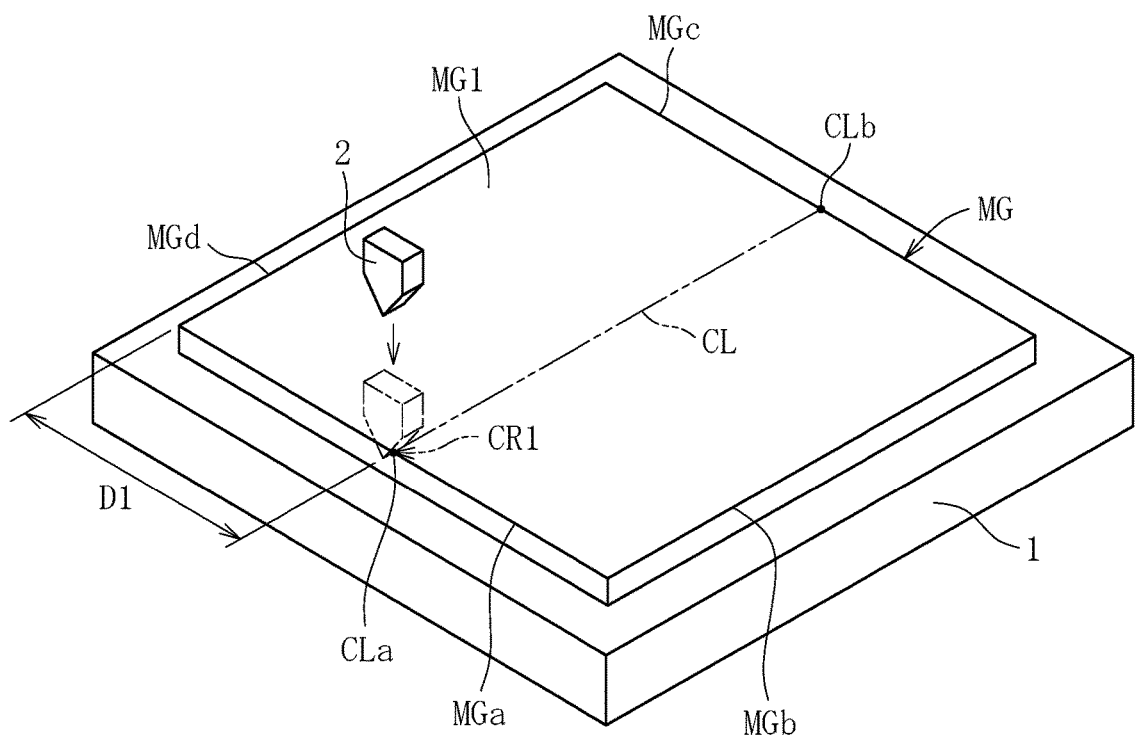
FIG. 2 is a perspective view for illustrating an initial crack forming step according to a first embodiment.

As illustrated in FIG. 2, in the initial crack forming step, an initial crack CR1 is formed on a part of a first surface MG1 of the mother glass sheet MG placed on a surface plate 1 with a clack forming device 2. The crack forming device 2 is formed of a pointed scriber, such as a sintered diamond cutter, but is not limited thereto. The crack forming device 2 may be formed of a diamond pen, a cemented carbide cutter, sandpaper, or the like.

A linear preset cleaving line CL is set in the mother glass sheet MG. The preset cleaving line CL is a straight line set substantially parallel to the second side MGb or the fourth side MGd of the mother glass sheet MG. The preset cleaving line CL has a cleaving start point CLa set in one end portion thereof and a cleaving end point CLb set in the other end portion thereof. The cleaving start point CLa of the preset cleaving line CL is set in a midway portion of the first side MGa. The cleaving end point CLb of the preset cleaving line CL is set in a midway portion of the third side MGc substantially parallel to the first side MGa.

The preset cleaving line CL is set at a position separated by a predetermined distance D1 from the fourth side MGd of the mother glass sheet MG. The separation distance D1 between the fourth side MGd and the preset cleaving line CL is equal to a ½ length of a length L1 of the first side MGa (D1=L1/2).

In the initial crack forming step, the crack forming device 2 is lowered from above the mother glass sheet MG to be brought into contact with the edge portion of the mother glass sheet MG on a first surface MG1 side, that is, the midway portion of the first side MGa. Thus, the initial crack CR1 is formed at the cleaving start point CLa of the preset cleaving line CL.

Figure 3:
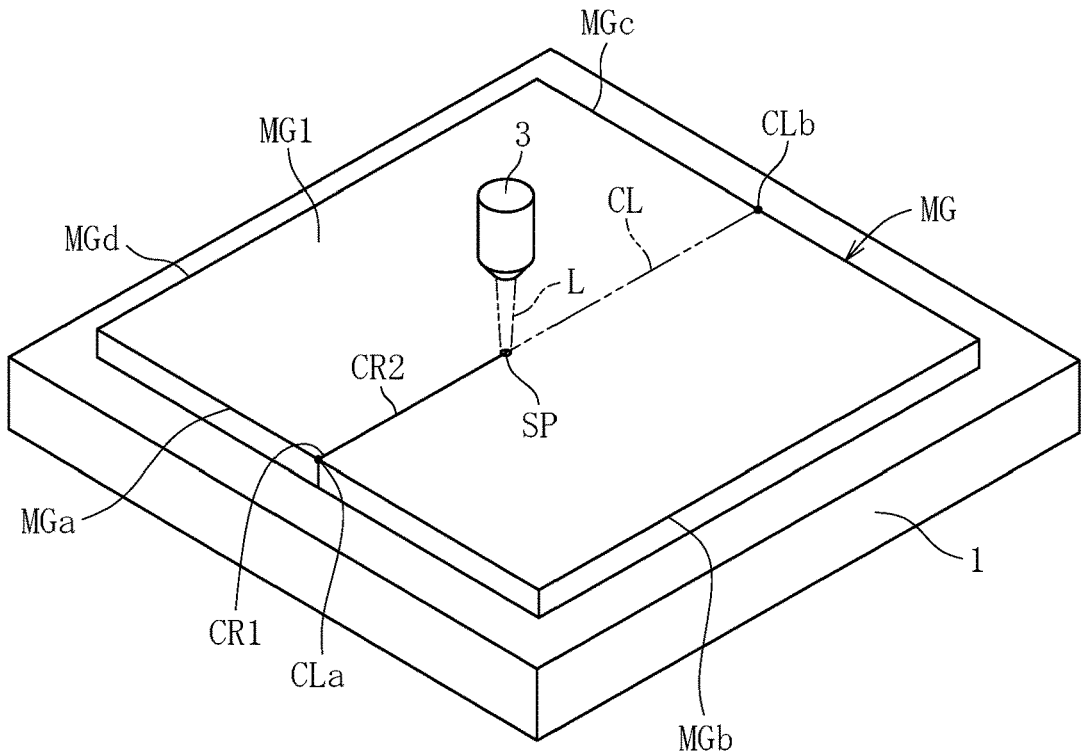
FIG. 3 is a perspective view for illustrating a laser irradiation step.

In the laser irradiation step, laser light L is radiated to the initial crack CR1 on the first surface MG1 by a laser irradiation device 3 and is scanned along the preset cleaving line CL. Specifically, the laser irradiation device 3 is configured to be three-dimensionally movable, and moves above the mother glass sheet MG placed on the surface plate 1 in a predetermined direction, to thereby scan the laser light L from the cleaving start point CLa to the cleaving end point CLb along the preset cleaving line CL. With this configuration, as illustrated in FIG. 3, a crack CR2 starting from the initial crack CR1 linearly propagates along the preset cleaving line CL. In addition, the crack CR2 propagates in the entire thickness direction of the mother glass sheet MG, and propagates to a second surface MG2 positioned on an opposite side to the first surface MG1.

The laser light L radiated from the laser irradiation device 3 is preferably a CO laser, an Er laser (Er: YAG laser), a Ho laser (Ho: YAG laser), or a HF laser. The laser light L may be pulse laser light or continuous laser light. When the CO laser light is used as the laser light, the wavelength thereof is set to preferably from 5.25 μm to 5.75 μm.

Figure 4:
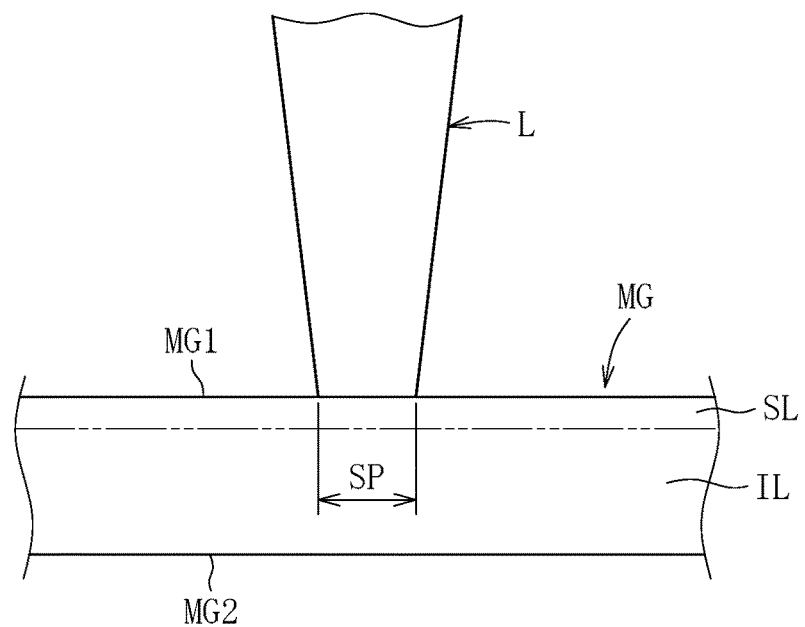
FIG. 4 is a side view of the mother glass sheet.

As illustrated in FIG. 3 and FIG. 4, the laser irradiation device 3 irradiates the first surface MG1 of the mother glass sheet MG with the laser light L so that a circular laser spot SP is formed. The irradiation diameter (spot diameter) of the laser light L is preferably from 1 mm to 8 mm, more preferably from 2 mm to 6 mm. The laser light L may be radiated to the mother glass sheet MG under a defocused state.

For example, when $CO_2$ laser light is used, a surface layer SL (for example, a range from the first surface MG1 to a depth of about 10 μm) of the mother glass sheet MG (first surface MG1) is only heated, and hence in order to provide the amount of heat required for cleaving, it is required to form the irradiation mode of the $CO_2$ laser light into an elongated shape (linear or elliptical shape) along the preset cleaving line CL. Further, it is required to cool the mother glass sheet MG with a refrigerant, such as cooling water, in order to generate a thermal shock sufficient for cleaving.

In contrast, in the method of manufacturing a glass sheet according to this embodiment, through use of the CO laser light L or the like that can be stably radiated with a high output, an inner portion IL (for example, a range from a depth of about 10 μm to a depth of about 3,000 μm) as well as the surface layer SL of the mother glass sheet MG can be heated even with the circular laser spot SP, and the amount of heat sufficient for generating a thermal shock (thermal stress) for causing the crack CR2 to propagate in the thickness direction can be provided. In the present invention, the surface layer SL of the mother glass sheet MG refers to a layer extending from the first surface MG1 of the mother glass sheet MG to a depth of 10 μm. The inner portion IL of the mother glass sheet MG refers to a region having a depth of more than 10 μm from the first surface MG1 (see FIG. 4).

In Tables 1 and 2 below, there is shown an average transmittance of each of the mother glass sheets MG when a plurality of types of mother glass sheets MG each having a predetermined thickness are irradiated with a CO laser and a $CO_2$ laser.

TABLE 1

| | Type of glass | | | | |
|---|---|---|---|---|---|
| | Alkali-free | Alkali-free | Boro-silicate | Soda | Soda |
| Thermal expansion coefficient ($\times 10^{-7}$/K) | 38 | 45 | 66 | 90 | 91 |
| Thickness (mm) | 0.5 | 0.5 | 0.5 | 0.5 | 0.5 |
| Average transmittance (%) (wavelength: 5.25 μm to 5.75 μm) | 0.2 | 0.2 | 0.1 | 0.9 | 0.9 |
| Average transmittance (%) (wavelength: 10.6 μm) | 0 | 0 | 0 | 0 | 0 |

TABLE 2

| | Type of glass | | | | |
|---|---|---|---|---|---|
| | Alkali-free | Alkali-free | Alkali-free | Alkali-free | Alkali-free |
| Thermal expansion coefficient ($\times 10^{-7}$/K) | 38 | 38 | 38 | 38 | 38 |
| Thickness (mm) | 0.1 | 0.2 | 0.5 | 0.7 | 1.1 |
| Average transmittance (%) (wavelength: 5.25 μm to 5.75 μm) | 26.8 | 7.4 | 0.2 | 0.05 | 0.01 |
| Average transmittance (%) (wavelength: 10.6 μm) | 0 | 0 | 0 | 0 | 0 |

As shown in Tables 1 and 2, the wavelength of the CO laser has a peak in the vicinity of from 5.25 μm to 5.75 μm, and the average transmittance of each of the various mother glass sheets MG at this wavelength is not zero. That is, the radiated CO laser is not entirely absorbed on the surface of the mother glass sheet MG, but is partially absorbed inside the glass sheet, and the remaining portion is transmitted through the mother glass sheet MG. As a result, with the CO laser, the inner portion of the mother glass sheet MG as well as the surface of the mother glass sheet MG can be heated.

Meanwhile, the wavelength of the $CO_2$ laser has a peak in the vicinity of 10.6 μm, and the average transmittance of each of the various mother glass sheets MG in the vicinity of this wavelength is zero. In this case, most of the radiated $CO_2$ laser is absorbed on the surface of the mother glass sheet MG, and is not absorbed inside the mother glass sheet MG. Consequently, the inner portion of the mother glass sheet MG cannot be heated by the $CO_2$ laser.

In the method of manufacturing a glass sheet according to this embodiment, the crack CR2 is caused to propagate in the thickness direction by heating the inner portion IL as well as the surface layer SL of the mother glass sheet MG. With this result, the mother glass sheet MG can be separated along the preset cleaving line CL without applying a bending stress to the mother glass sheet MG, and hence a folding and separating step can be omitted. In addition, it becomes possible to cut the mother glass sheet MG without cooling the mother glass sheet MG with a refrigerant as in the related art. From the viewpoint of accelerating the propagation of the crack CR2, it is preferred that the irradiation portion with the laser light L and the periphery thereof be cooled by jetting a refrigerant from a nozzle as in a second embodiment described later. From the viewpoint of simplifying the configuration of the laser irradiation device 3, it is preferred that the mother glass sheet MG be cut without cooling the irradiation portion with the laser light L and the periphery thereof by jetting a refrigerant.

Figure 5:
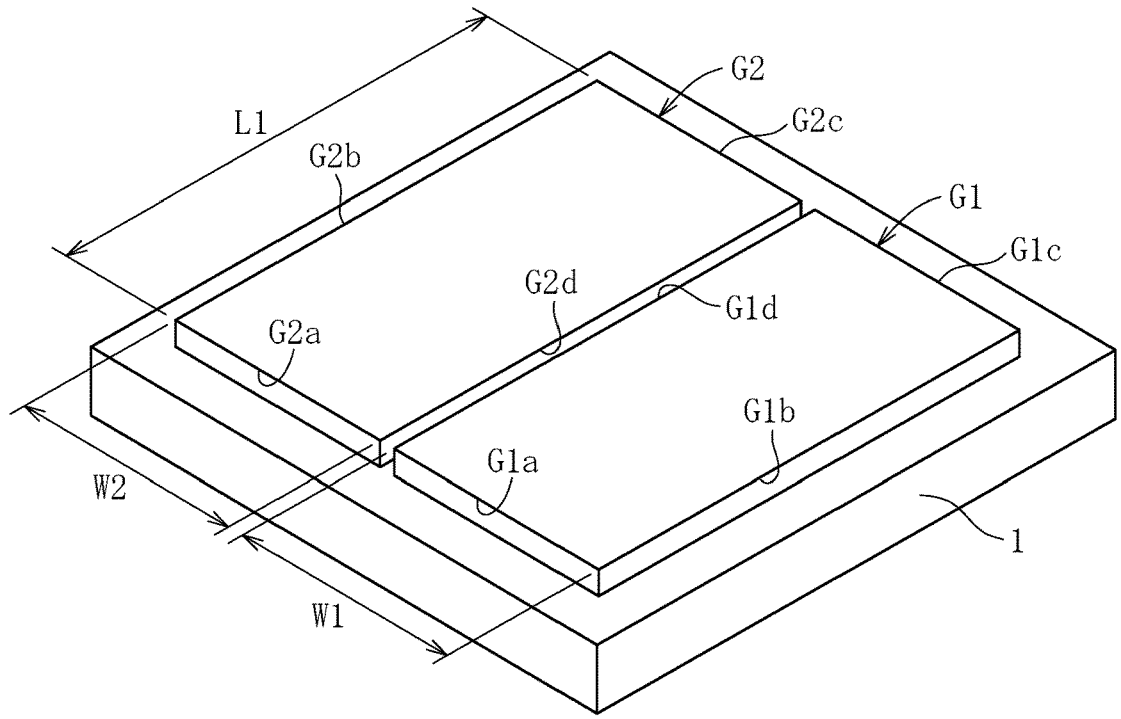
FIG. 5 is a perspective view for illustrating glass sheets after the laser irradiation step.

As illustrated in FIG. 5, when the laser light L is scanned from the cleaving start point CLa to the cleaving end point CLb along the preset cleaving line CL, the crack CR2 propagates along the preset cleaving line CL. Thus, two glass sheets G1 and G2 are formed from one mother glass sheet MG.

Of the two glass sheets G1 and G2, one glass sheet G1 and the other glass sheet G2 are hereinafter referred to as "first glass sheet" and "second glass sheet," respectively. The first glass sheet G1 comprises a first side G1a to a fourth side G1d that form an edge portion. The second glass sheet G2 comprises a first side G2a to a fourth side G2d that form an edge portion. The first glass sheet G1 and the second glass sheet G2 are formed into rectangular shapes having the same dimensions. A width dimension W1 of the first side G1a of the first glass sheet G1 is the same as a width dimension W2 of the first side G2a of the second glass sheet G2 (W1=W2=L1/2).

As described above, when the mother glass sheet MG is divided into halves, the mother glass sheet MG can be accurately cut by scanning the laser light L along the preset cleaving line CL without correction of the scanning trajectory of the laser light L.

Next, the case in which correction of the scanning trajectory of the laser light L is performed is described. The correction of the scanning trajectory of the laser light L is required, for example, when the first glass sheet G1 and the second glass sheet G2 have different sizes.

Figure 6:
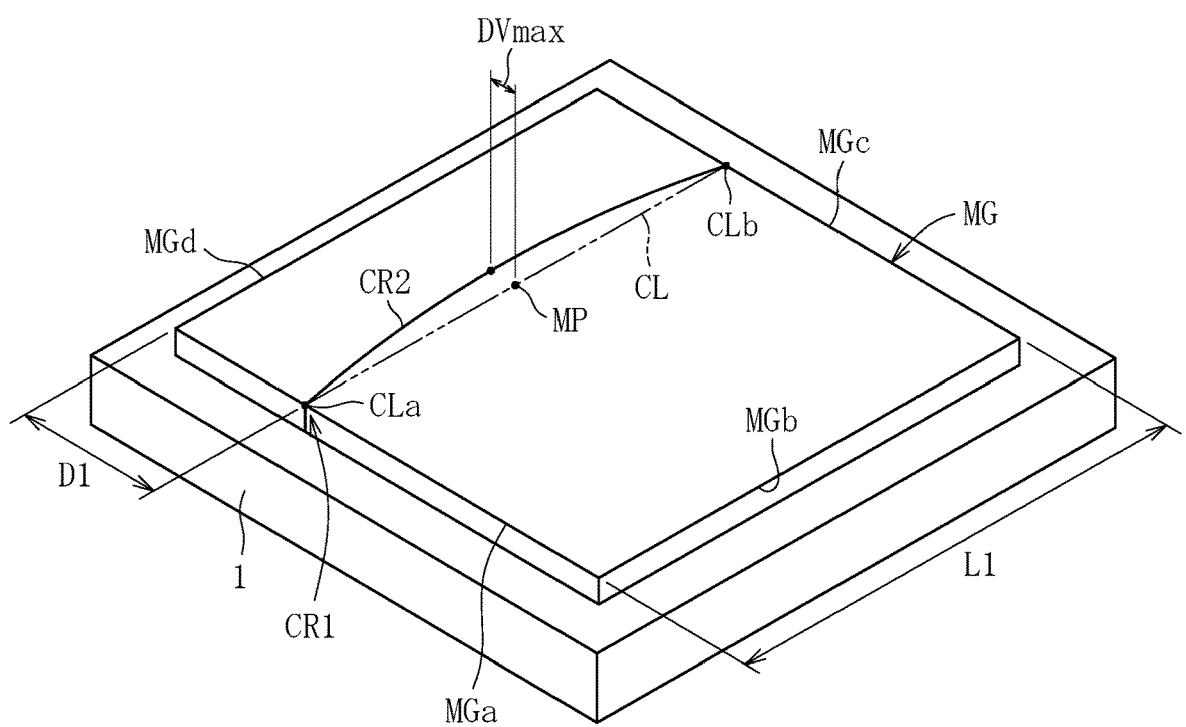
FIG. 6 is a perspective view for illustrating the laser irradiation step.

In FIG. 6, the case in which the first glass sheet G1 having a large size and the second glass sheet G2 having a small size are cut out of the mother glass sheet MG is given as an example. In this example, when the laser light L is scanned along the linear preset cleaving line CL set in the mother glass sheet MG, the crack CR2 does not coincide with the preset cleaving line CL, and propagates under a state of deviating from the preset cleaving line CL in some cases.

Figure 7:
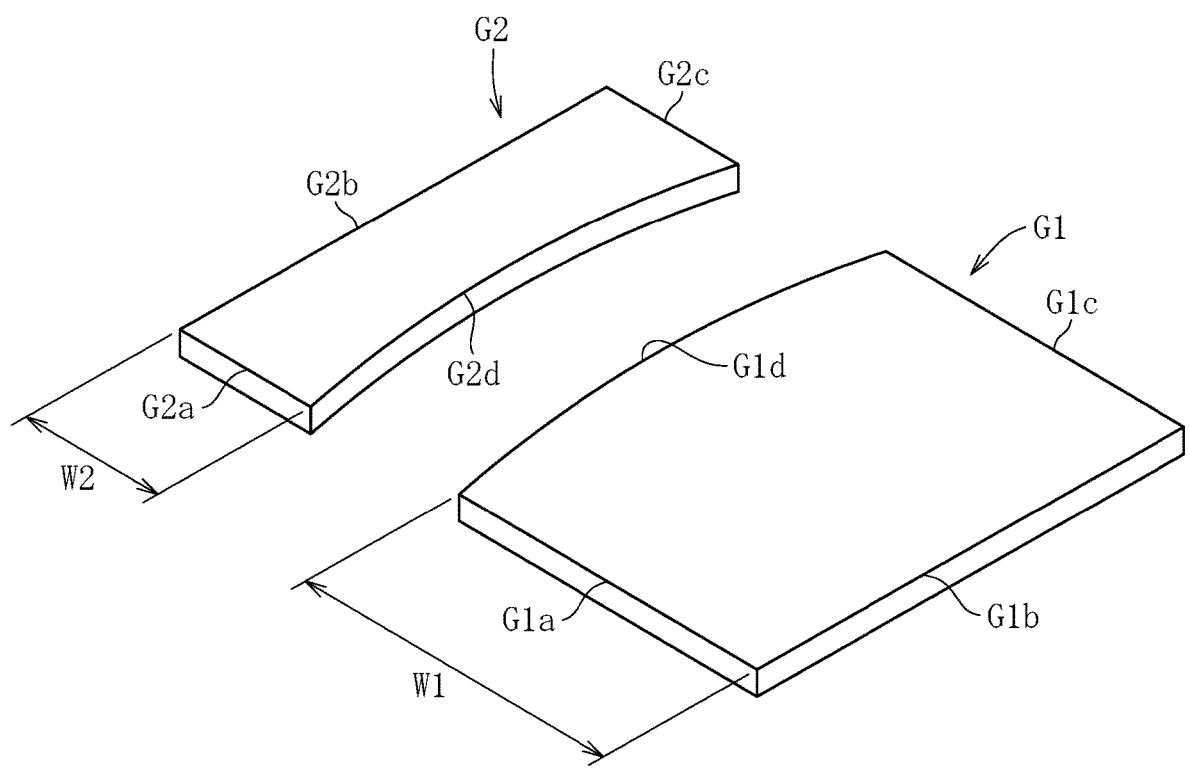
FIG. 7 is a perspective view for illustrating glass sheets after the laser irradiation step.

According to investigations made by the inventors of the present invention, it is ascertained that the deviation of the crack CR2 occurs when the distance D1 between the fourth side MGd of the mother glass sheet MG and the preset cleaving line CL is less than ½ of the length dimension L1 of the first side MGa of the mother glass sheet MG (D1<L1/2, see FIG. 6), or is more than ½ thereof (D1>L1/2). In the example illustrated in FIG. 6, the distance D1 is set to L1/3 with respect to the length dimension L1 of one side of the mother glass sheet MG. When the mother glass sheet MG is cut, as illustrated in FIG. 7, the width dimension W1 of a short side (first side G1a) of the first glass sheet G1 becomes larger than the width dimension W2 of a short side (first side G2a) of the second glass sheet G2 (W1>W2).

It is also ascertained that, when the deviation of the crack CR2 from the preset cleaving line CL occurs, its deviation amount (distance from the preset cleaving line CL to the crack CR2) DV becomes largest at a middle position MP of the preset cleaving line CL (position at half the length of the preset cleaving line CL). In FIG. 6, a maximum deviation amount of the crack CR2 corresponding to the middle position MP of the preset cleaving line CL is denoted by reference symbol DVmax. When the length dimension L1 of one side of the mother glass sheet MG is 150 mm, the maximum deviation amount DVmax is, for example, from about 0.3 mm to about 1.5 mm while the maximum deviation amount DVmax varies depending on cooling conditions, a scanning speed, or the irradiation diameter.

A propagation trajectory of the crack CR2 is formed into a curved shape with respect to the linear preset cleaving line CL. As illustrated in FIG. 7, when the mother glass sheet MG is cleaved with such crack CR2, the fourth side G1d formed in the first glass sheet G1 by the cleaving is formed of a convex curve. In addition, the fourth side G2d formed in the second glass sheet G2 by the cleaving is formed of a concave curve.

In order to reduce such deviation of the crack CR2 as described above, a correction step (preparation step) of recognizing the degree of deviation and correcting the scanning trajectory of the laser light L is performed before the cleaving step.

The correction step comprises: a measurement step of performing measurement required for correction of the scanning trajectory of the laser light L; and a corrected trajectory determination step of determining the scanning trajectory of the laser light L.

In the measurement step, the laser light L is radiated to the first surface MG1 of the mother glass sheet MG for measurement to cleave the mother glass sheet MG.

Figure 8:
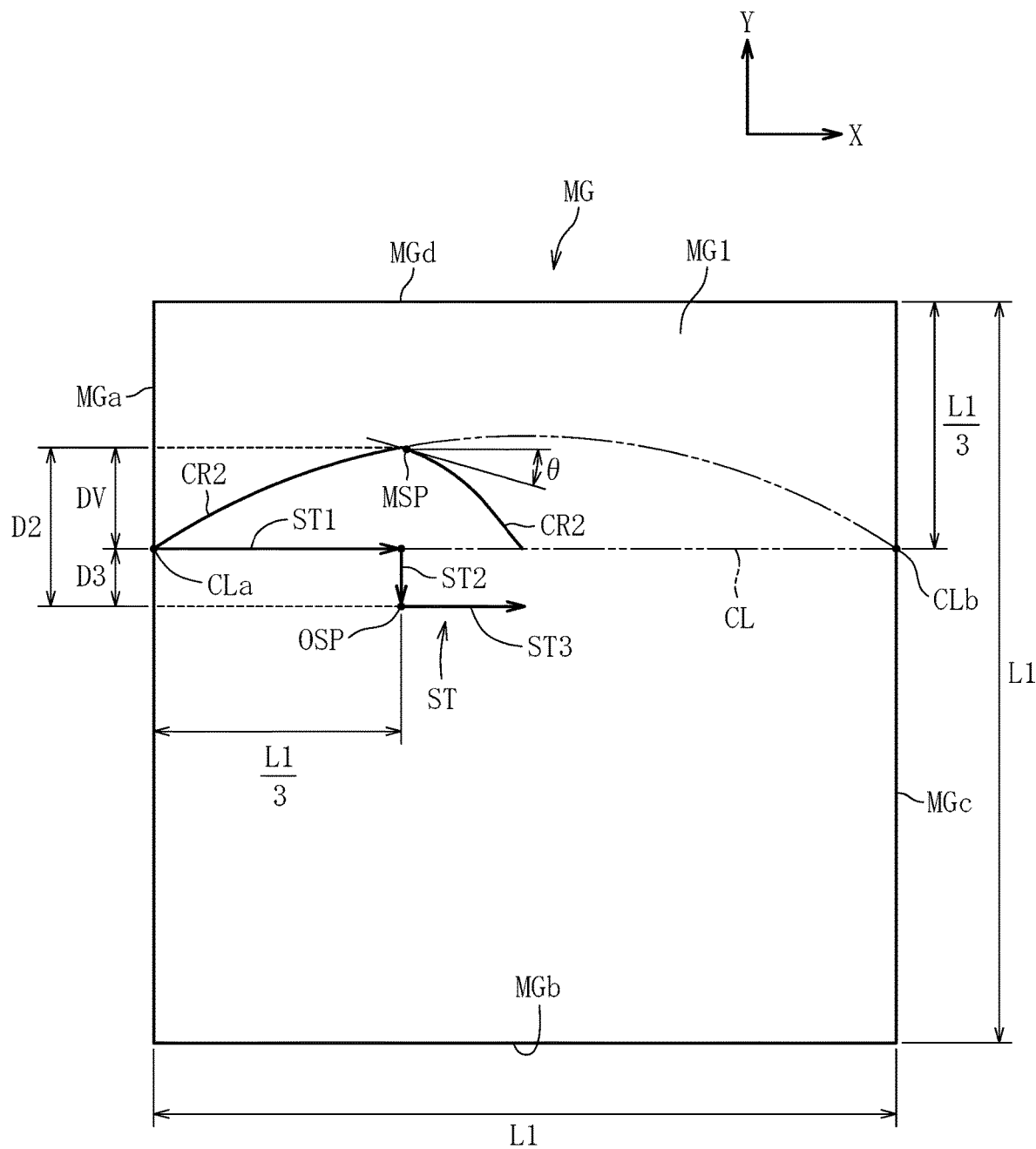
FIG. 8 is a plan view of the mother glass sheet for illustrating a measurement step according to a correction step.

A scanning trajectory ST for measurement of the laser light L set in the mother glass sheet MG in the measurement step and the propagation trajectory of the crack CR2 are illustrated in FIG. 8. The scanning trajectory ST for measurement of the laser light L comprises a first trajectory ST1, a second trajectory ST2, and a third trajectory ST3.

The first trajectory ST1 is a straight line formed from the cleaving start point CLa along the preset cleaving line CL. The length of the first trajectory ST1 is arbitrarily set. The length of the first trajectory ST1 is set to L1/3 (2L1/6) with respect to the length L1 of one side of the mother glass sheet MG, but is not limited thereto. The length of the first trajectory ST1 may be set to, for example, L1/6, 3L1/6, 4 L1/6, or 5L1/6. In the measurement step, a plurality of mother glass sheets MG for measurement are cut by changing the length of the first trajectory ST1. The second trajectory ST2 is a straight line intersecting with the first trajectory ST1. An intersection angle between the second trajectory ST2 and the first trajectory ST1 is set to 90°, but is not limited to this angle. The length of the second trajectory ST2 is set in order to offset (separate) the third trajectory ST3 from the preset cleaving line CL.

The third trajectory ST3 is a straight line extending substantially parallel to the preset cleaving line CL at a position offset (separated) from the preset cleaving line CL. The third trajectory ST3 may reach the third side MGc on which the cleaving end point CLb is set in the mother glass sheet MG. A position OSP of a start point of the third trajectory ST3 is hereinafter referred to as "offset position (separation position)." The offset position OSP is also the position of an end point of the second trajectory ST2.

As illustrated in FIG. 8, in the measurement step, the laser light L is scanned so as to follow the first trajectory ST1, and thus the crack CR2 propagates under a state of deviating from the preset cleaving line CL. After that, the laser light L is scanned so as to follow the third trajectory ST3 after passing through the second trajectory ST2, and thus the crack CR2 propagates toward the preset cleaving line CL.

That is, during the movement of the laser light L along the first trajectory ST1, the crack CR2 forms a curved trajectory so as to be gradually separated from the preset cleaving line CL. Meanwhile, when the laser light L is scanned along the third trajectory ST3, the crack CR2 changes its propagation direction and propagates so as to approach the preset cleaving line CL.

In the measurement step, at a position at which the laser light L is separated from the preset cleaving line CL by the second trajectory ST2, the propagation direction of the crack CR2 after having been changed in direction is measured as a crack angle θ. As illustrated in FIG. 8, the crack angle θ is an angle formed by: a line representing the inclination of a trajectory (curve) formed by the crack CR2 when the crack CR2 changes its propagation direction; and the preset cleaving line CL (in this embodiment, an X axis of an XY orthogonal coordinate system set in the mother glass sheet MG). For example, when the position of the crack CR2 is measured at a predetermined pitch (e.g., 0.2 mm), the line representing the inclination of the crack CR2 may be formed of a line connecting: a position (MSP) at which the laser light L is separated from the preset cleaving line CL; and the next measurement point (position separated from MSP by 0.2 mm in an X-axis direction).

In the measurement step, the plurality of mother glass sheets MG for measurement are cut by changing the length of the second trajectory ST2 within the range of, for example, from 0 mm to 1 mm, and crack angles θ according to the respective mother glass sheets MG are measured. Further, in the measurement step, a distance D2 in a Y-axis direction between a measurement position (measurement point) MSP of the crack angle θ and the irradiation position of the laser light L corresponding to the measurement position MSP (hereinafter referred to as "distance between the crack and the laser light") is measured. As illustrated in FIG. 8, the distance D2 is the sum of: the distance DV from the measurement position MSP of the crack angle θ to the preset cleaving line CL; and a distance (offset amount) D3 from the preset cleaving line CL to the irradiation position of the laser light L (D2=DV+D3).

Figure 9:
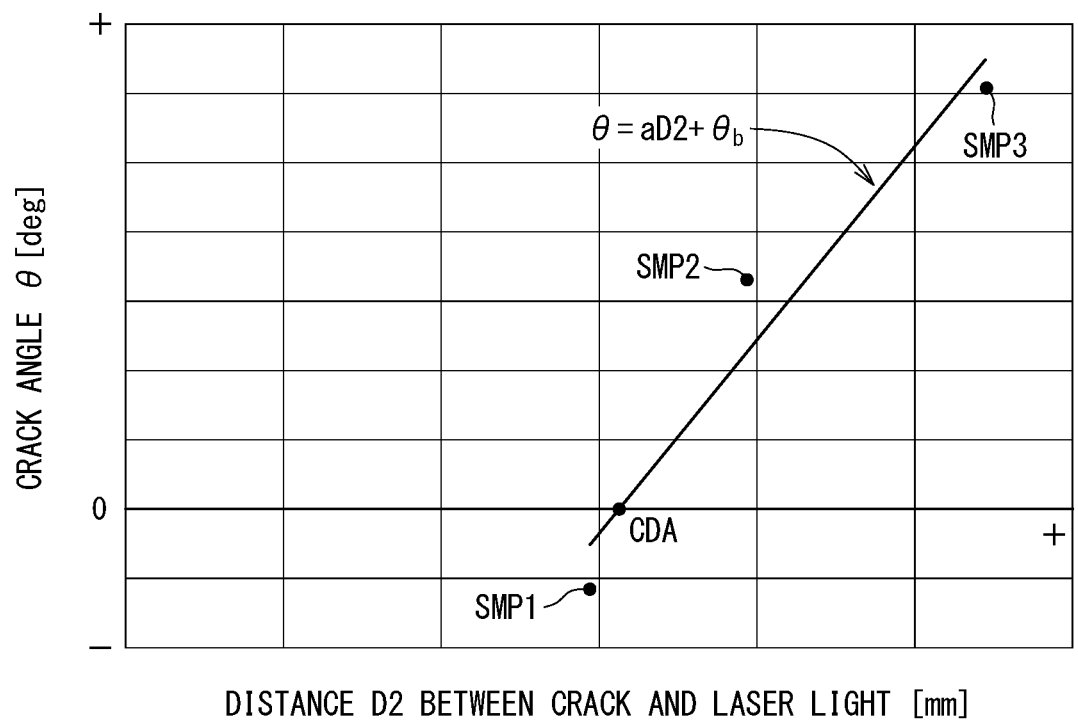
FIG. 9 is a graph showing examples of the results of the measurement step.

FIG. 9 is a graph showing a relationship (measurement results) between: the distance D2 between the crack CR2 and the laser light L; and the crack angle θ. As examples, three pieces of data, first measurement data SMP1 to third measurement data SMP3, are shown. The first measurement data SMP1 is measurement data when the length of the second trajectory ST2 is set to 0 (mm), that is, the laser light L is scanned along the preset cleaving line CL. The second measurement data SMP2 and the third measurement data SMP3 are measurement data when the mother glass sheets MG are cleaved by setting different lengths of the second trajectories ST2. Specifically, the second trajectory ST2 in the second measurement data SMP2 is shorter than the second trajectory ST2 in the third measurement data SMP3.

Based on the measurement results, the following approximation formula (linear function) representing the relationship between: the distance D2 between the crack CR2 and the laser light L; and the crack angle θ corresponding to the measurement position MSP is created.

$$\theta = aD2 + \theta_b$$

Figure 10:
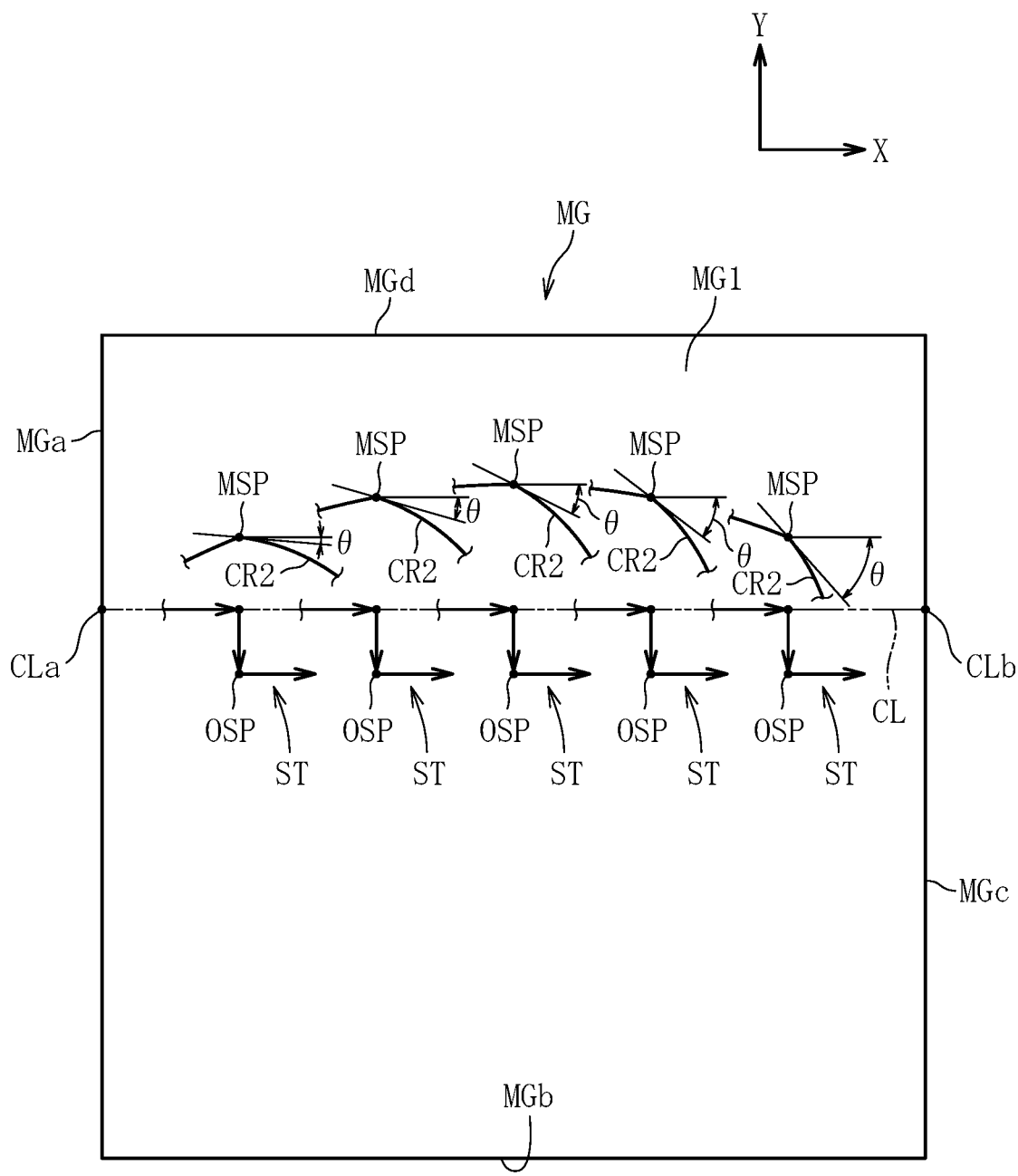
FIG. 10 is a plan view of the mother glass sheet for illustrating the measurement step according to the correction step.

In the measurement step, the plurality of mother glass sheets MG for measurement are cleaved by setting different offset positions OSP of the laser light L for the respective mother glass sheets MG. For example, as illustrated in FIG. 10, it is desired to set the offset positions OSP for the respective mother glass sheets MG so that the offset positions OSP are equally spaced from each other in the X-axis direction. The number of offset positions OSP set in the mother glass sheet MG for measurement is desirably set to the highest possible number in order to accurately set the trajectory of the laser light L.

The crack angles θ corresponding to scanning of the laser light L at the respective offset positions OSP are measured, and the graph of FIG. 9 and the above-mentioned approximation formula are created depending on the respective measurement data.

In the corrected trajectory determination step, the scanning trajectory of the laser light L is determined based on the results of the measurement step. Specifically, based on the above-mentioned approximation formula, a distance CDA between the crack CR2 and the laser light L at which the crack angle θ becomes 0° is calculated (see FIG. 9). The calculation is performed on the measurement results for the plurality of offset positions OSP obtained in the measurement step.

After that, the distance CDA thus calculated is used as a corrected offset amount (corrected separation distance) CDB of the laser light L from the preset cleaving line CL required for each of the offset positions OSP (CDB=CDA).

Figure 11:
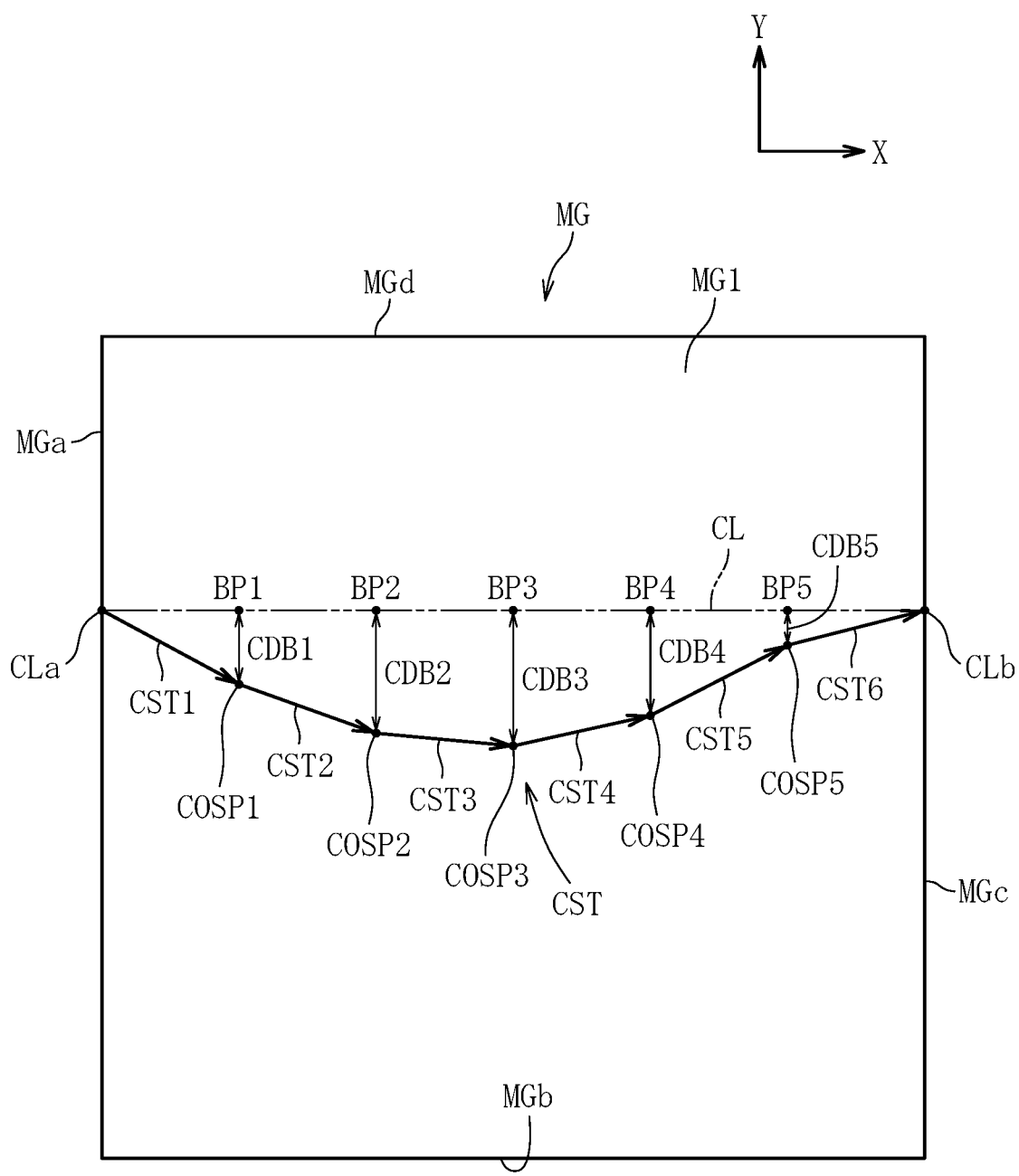
FIG. 11 is a plan view of the mother glass sheet for illustrating a corrected trajectory determination step.

As illustrated in FIG. 11, for reference positions BP1 to BP5 set in the preset cleaving line CL of the mother glass sheet MG, corrected offset positions COSP1 to COSP5 in which corrected offset amounts (corrected separation distances) CDB1 to CDB5 are reflected are set.

In the corrected trajectory determination step, a corrected trajectory CST of the laser light L that passes through the corrected offset positions COSP1 to COSP5 is set. Specifically, the corrected trajectory CST is formed by combining a plurality of linear trajectories CST1 to CST6 that connect the corrected offset positions COSP1 to COSP5 from the cleaving start point CLa to the cleaving end point CLb.

A start point of the corrected trajectory CST coincides with the cleaving start point CLa of the preset cleaving line CL. In addition, an end point of the corrected trajectory CST coincides with the cleaving end point CLb of the preset cleaving line CL. That is, the corrected offset positions COSP1 to COSP5 of the corrected trajectory CST are each set in a midway portion of the preset cleaving line CL excluding the cleaving start point CLa and the cleaving end point CLb so as to be separated from the preset cleaving line CL on the side of a region of the mother glass sheet MG corresponding to the first glass sheet G1. In addition, the corrected trajectory CST is formed into a concave shape with respect to the preset cleaving line CL in the region of the mother glass sheet MG corresponding to the first glass sheet G1.

After the above-mentioned corrected trajectory determination step, the cleaving step is performed on the mother glass sheet MG for a product. In the laser irradiation step, the laser light L is radiated along the corrected trajectory CST set in the mother glass sheet MG, and thus the crack CR2 can be caused to propagate along the preset cleaving line CL. As a result, the mother glass sheet MG can be accurately cut. For example, when the length dimension L1 of one side of the mother glass sheet MG is 150 mm and the maximum deviation amount DVmax is 0.6 mm without correction, the maximum deviation amount DVmax can be reduced to less than 0.2 mm (DVmax<0.2 mm) by performing the above-mentioned correction.

The creation of the graph, the creation or calculation of the approximation formula in the measurement step, and various calculations in the corrected trajectory determination step may be performed by a computer or by a measurer himself/herself. The crack angle θ and the distance D2 between the crack CR2 and the laser light L may be calculated through analysis, and for example, may be calculated by determining a temperature distribution through heat transfer analysis, thereafter determining a stress distribution through thermal stress analysis using the temperature distribution, and thereafter performing crack propagation analysis using the stress distribution.

Figure 12:
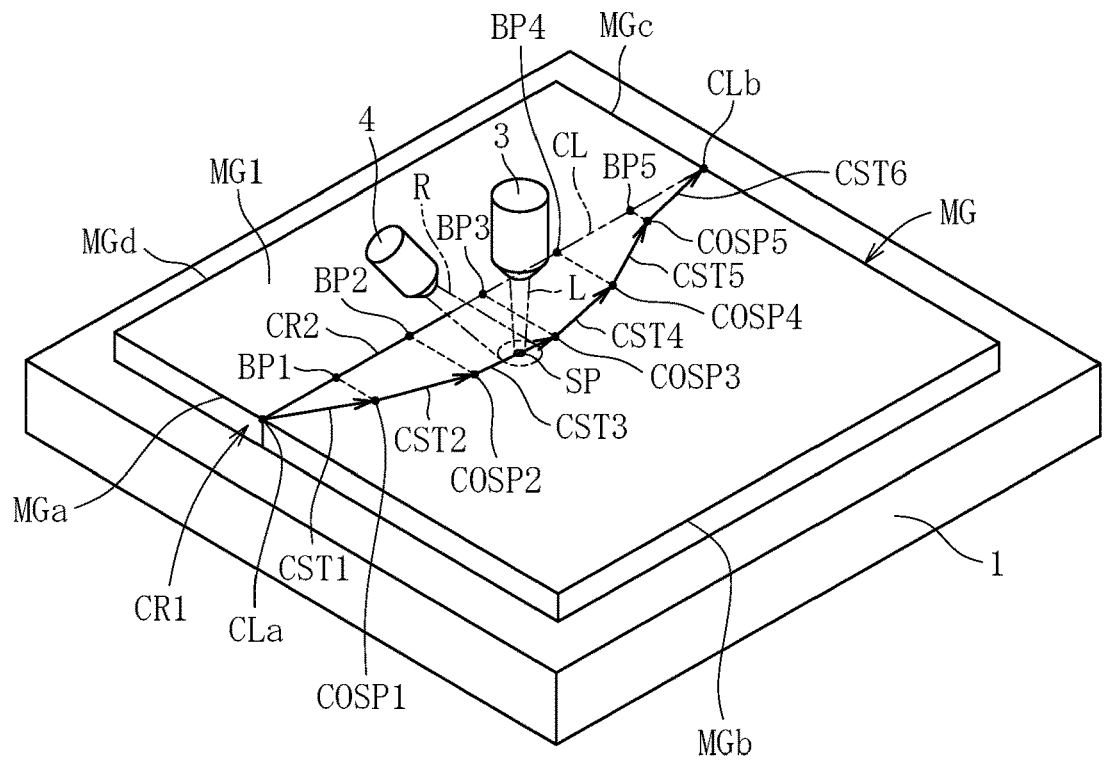
FIG. 12 is a perspective view for illustrating a laser irradiation step according to a second embodiment.

In FIG. 12, there is illustrated a method of manufacturing a glass sheet according to a second embodiment of the present invention. In this example, in the cleaving step, the periphery of the irradiation portion (laser spot SP) with the laser light L is cooled by a refrigerant R (for example, air) jetted from a cooling device 4.

The cooling device 4 is configured to move following the laser irradiation device 3. The cooling device 4 jets the refrigerant R from a nozzle thereof toward the irradiation portion (laser spot SP) with the laser light L and the periphery thereof. As the refrigerant R, an inert gas, such as He or Ar, or a $N_2$ gas that is non-oxidizing is suitably used in addition to air. In this embodiment, through cooling of the irradiation portion with the laser light L and the periphery thereof with the refrigerant R, a thermal shock for causing the crack CR2 to propagate can be more significantly generated. When a CO laser is used, CO laser light absorbs moisture, and hence the output of the CO laser is attenuated by the moisture. As a result, it is better not to use water as the refrigerant R. However, this is not the case when the output attenuation is effectively used.

The laser irradiation device 3 and the cooling device 4 may be integrally formed. For example, a jetting port of the nozzle of the cooling device 4 may be formed into an annular shape, and the laser irradiation device 3 may be arranged on an inner side of the jetting port having an annular shape.

When the periphery of the irradiation portion (laser spot SP) with the laser light L is cooled, the deviation amount of the crack CR2 from the preset cleaving line CL can be reduced. The cooling may be performed from the back, the front, or the side of the irradiation portion (laser spot SP) with the laser light L, and is preferably performed from the back as illustrated in FIG. 12 from the viewpoint of further reducing the deviation. The front, the back, and the side are based on a scanning direction (traveling direction) of the laser light L. For example, performing cooling from the front means that cooling is performed through use of the cooling device 4 arranged on the cleaving end point CLb side with respect to the laser spot SP (laser irradiation device 3). In addition, performing cooling from the back means that cooling is performed through use of the cooling device 4 arranged on the cleaving start point CLa side with respect to the laser spot SP (laser irradiation device 3).

The jetting range of the refrigerant R by the nozzle of the cooling device 4 may not overlap the laser spot SP. That is, the refrigerant R may be jetted to a position away from the laser spot SP. From the viewpoint of further reducing the deviation of the crack CR2, the distance between the jetting range of the refrigerant R by the nozzle of the cooling device 4 and the laser spot SP is preferably shorter, and the jetting range of the refrigerant R more preferably overlaps the laser spot SP partially or entirely. Here, the jetting range (cooling range) of the refrigerant R by the nozzle means a range in which the refrigerant R jetted from the nozzle directly reaches and cools the mother glass sheet MG, and excludes the case in which the refrigerant R that is brought into contact with the mother glass sheet MG and changed in a flow direction indirectly reaches and cools the laser spot SP.

The present invention is not limited to the configurations of the above-mentioned embodiments. In addition, the action and effect of the present invention are not limited to those described above. The present invention may be modified in various forms within the range not departing from the spirit of the present invention.

While the case in which the mother glass sheet MG is cut by forming the initial crack CR1 on the first surface MG1 of the mother glass sheet MG, and radiating the laser light L to the first surface MG1 has been given as an example in each of the above-mentioned embodiments, the present invention is not limited to this configuration. For example, the mother glass sheet MG may be cut by forming the initial crack CR1 on the first surface MG1 (one surface), and radiating the laser light L to the second surface MG2 (the other surface).

While the laser irradiation step in which the laser light L is radiated to a position separated from the preset cleaving line CL in a part of the preset cleaving line CL excluding the cleaving start point CLa and the cleaving end point CLb has been given as an example in each of the above-mentioned embodiments, the present invention is not limited to this configuration. For example, the laser light L may be radiated to a position separated from the cleaving start point CLa or a position separated from the cleaving end point CLb in the laser irradiation step.

While the configuration in which a relationship between: the distance D2 between the crack CR2 and the laser light L; and the crack angle θ is determined in the measurement step, and the distance D2 (CDA) at which the crack angle θ becomes 0° is used as the corrected offset amount (corrected separation distance) CDB in the corrected trajectory determination step has been given as an example in each of the above-mentioned embodiments, the present invention is not limited to this configuration. D2=DV+D3 is established, and hence it is also appropriate to determine a relationship between the offset amount D3 and the crack angle θ in the measurement step, and use a value obtained by adding the offset amount D3 at which the crack angle θ becomes 0° to the distance DV between the measurement position MSP of the crack angle θ and the preset cleaving line CL as the corrected offset amount (corrected separation distance) CDB (CDB=D3+DV) in the corrected trajectory determination step.

While the configuration in which the scanning trajectory of the laser light L is corrected based on the crack angle θ or the like has been given as an example in each of the above-mentioned embodiments, the present invention is not limited to this configuration. For example, the corrected trajectory CST may be formed into an arc shape or a parabolic shape. When the corrected trajectory CST has an arc shape, the radius of curvature thereof may be appropriately set depending on the maximum deviation amount DVmax.

EXAMPLES

Now, Examples according to the condition of a thermal stress $\sigma_T$ of the present invention are described, but the present invention is not limited to Examples.

The inventors of the present invention have performed a cutting test of a glass sheet through use of a laser irradiation device. In this test, a plurality of mother glass sheets having different thicknesses were continuously irradiated with CO laser light under different conditions (output, scanning speed, irradiation diameter). The laser light was radiated along a corrected trajectory formed into a concave shape. Thus, the mother glass sheet was cleaved into small glass sheets along a linear preset cleaving line. In this cutting test, alkali-free glass, soda glass, and borosilicate glass were used as samples of the mother glass sheets. In the cutting test, all the mother glass sheets were able to be satisfactorily cleaved by using the CO laser light.

In addition, for example, a thermal stress $\sigma_T$ (MPa) when the mother glass sheet having a thickness of 0.5 mm was cut was calculated by the following mathematical expression 1. The calculation results are shown in Table 3.

$$\sigma_T = \frac{E \cdot \alpha \cdot \Delta T}{2(1-v)} \qquad \text{[Math. 1]}$$

where E represents a Young's modulus (MPa) of the mother glass sheet, α represents a thermal expansion coefficient (/K) of the mother glass sheet, ν represents a Poisson's ratio of the mother glass sheet, and ΔT represents a difference between a temperature (K) at an irradiation position of the laser light with respect to the mother glass sheet and a temperature (K) at a position away from the irradiation position.

TABLE 3

| | Type of glass | | | | |
|---|---|---|---|---|---|
| | Alkali-free | Alkali-free | Boro-silicate | Soda | Soda |
| Young's modulus (GPa) | 73 | 80 | 77 | 73 | 70 |
| Thermal expansion coefficient (×10⁻⁷/K) | 38 | 45 | 66 | 90 | 91 |
| Poisson's ratio | 0.2 | 0.2 | 0.2 | 0.2 | 0.2 |
| Thickness (mm) | 0.5 | 0.5 | 0.5 | 0.5 | 0.55 |
| Output (W) | 38 | 38 | 38 | 38 | 38 |
| Speed (mm/sec) | 20 | 40 | 70 | 90 | 90 |
| Irradiation diameter (mm) | 6 | 6 | 6 | 6 | 6 |
| ΔT (K) | 550 | 420 | 320 | 250 | 260 |
| $\sigma_T$ (MPa) | 95 | 95 | 102 | 103 | 104 |

As shown in Table 3, in order to obtain a satisfactory cut surface with a mother glass sheet having a thickness of about 0.5 mm, it is desired that a thermal stress $\sigma_T$ of about 100 MPa be applied to the mother glass sheet at the time of cutting regardless of the type of glass.

Figure 13:
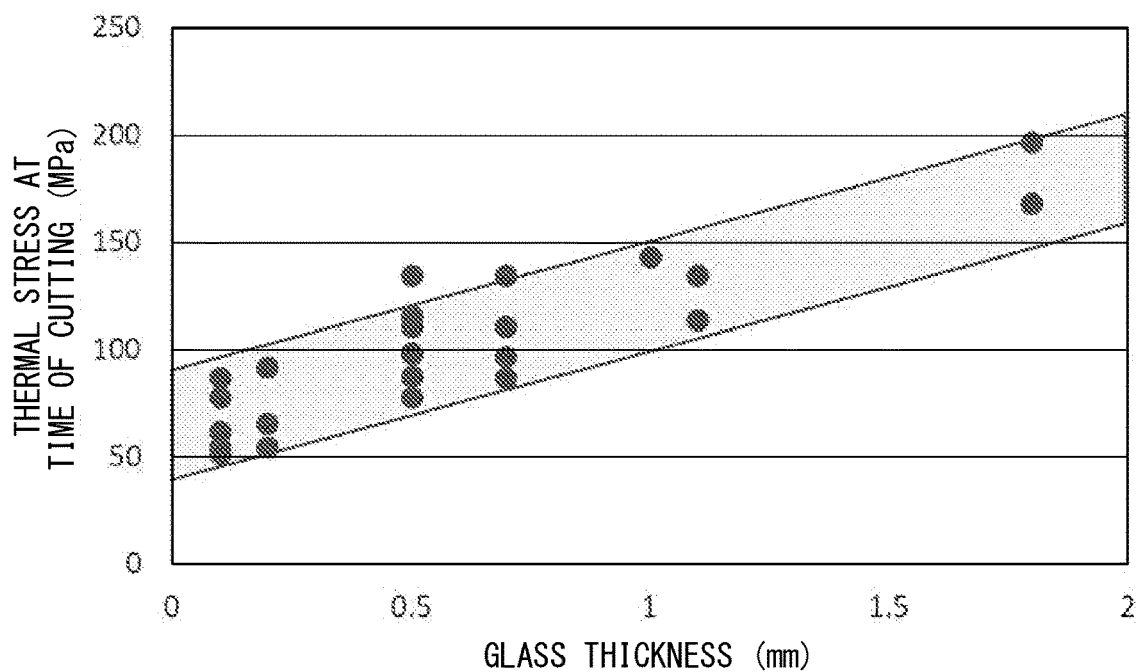
FIG. 13 is a graph showing a relationship between a thermal stress and the thickness of a glass sheet.

The thermal stress $\sigma_T$ for obtaining an appropriate cut surface varies depending on the thickness of the mother glass sheet. The inventors of the present invention have conducted a test in which a plurality of mother glass sheets having different thicknesses were cut with a CO laser, and have determined the relationship between the thickness of the mother glass sheet and thermal stress. This cutting test was performed on alkali-free glass, soda glass, and borosilicate glass as samples of the mother glass sheet. In FIG. 13, there is shown the relationship between the thickness of the mother glass sheet and the thermal stress in the cutting test. Under the test conditions shown in FIG. 13, satisfactory cut surfaces were able to be obtained in all the cases.

From the test results, the inventors of the present invention have found that it is desired that, in order to obtain a satisfactory cut surface when a mother glass sheet is cut with a CO laser, the laser irradiation step be performed so that the thermal stress $\sigma_T$ (MPa) of the mother glass sheet calculated by the above-mentioned mathematical expression 1 satisfies the following mathematical expression 2.

$$40 + 60t \leq \sigma_T \leq 90 + 60t \qquad \text{[Math. 2]}$$

where "t" represents a thickness (mm) of the mother glass sheet.

Regarding the temperature measurement of the mother glass sheet, the upper surface temperature of the mother glass sheet was measured by glass temperature measurement thermography (PI450G7 manufactured by Optris) at each of an irradiation position of laser light and a separation position that was separated by 10 mm forward from the irradiation position. The difference between the temperature at the irradiation position of the laser light and the temperature at the separation position separated from the irradiation position was defined as the above-mentioned temperature difference ΔT. The temperature of the mother glass sheet during irradiation of the laser light was changed by changing the output and the processing speed condition. The temperature at the separation position was substantially the same as room temperature.

REFERENCE SIGNS LIST

CL preset cleaving line
CR1 initial crack
CR2 crack
CST corrected trajectory
G1 first glass sheet
G2 second glass sheet
W1 width of first glass sheet
W2 width of second glass sheet
L laser light
MG mother glass sheet
MG1 surface of mother glass sheet (first surface)
MG2 surface of mother glass sheet (second surface)

The invention claimed is:

1. A method of manufacturing a glass sheet, the method comprising:
    an initial crack forming step of forming an initial crack on a mother glass sheet; and
    a laser irradiation step of irradiating the mother glass sheet with laser light to generate a thermal stress to cause a crack to propagate through the thermal stress along a preset cleaving line through use of the initial crack as a starting point and cause the crack to propagate in a thickness direction of the mother glass sheet, to thereby cleave the mother glass sheet into a first glass sheet and a second glass sheet,
    wherein, in the initial crack forming step, the initial crack is formed at only a cleaving start point of the preset cleaving line,
    wherein, in the laser irradiation step, the laser light irradiating the mother glass sheet is a single laser spot, and
    wherein, in the laser irradiation step, the irradiating comprises radiating, for at least a part of the preset cleaving line, the laser light to a position separated from the preset cleaving line so that the crack propagates along the preset cleaving line,
    wherein a width of the first glass sheet is larger than a width of the second glass sheet,
    wherein, in the laser irradiation step, the irradiating comprises radiating, for a midway portion of the preset cleaving line, the laser light so as to be separated from the preset cleaving line on a side of a region of the mother glass sheet corresponding to the first glass sheet,
    wherein the mother glass sheet has a rectangular shape,
    wherein the preset cleaving line is formed into a linear shape, and
    wherein, in the laser irradiation step, the irradiating comprises radiating the laser light to the mother glass sheet along a trajectory formed into a concave shape with respect to the preset cleaving line so that the crack propagates along the preset cleaving line.

2. The method of manufacturing a glass sheet according to claim 1, further comprising, before the laser irradiation step, a correction step of correcting a scanning trajectory of the laser light for the mother glass sheet,
    wherein the correction step comprises:

a measurement step of measuring a change in propagation direction of the crack as a crack angle when the laser light is scanned so as to be separated from the preset cleaving line; and a corrected trajectory determination step of setting, based on the crack angle measured in the measurement step, a distance by which the laser light is separated from the preset cleaving line in the laser irradiation step.

3. The method of manufacturing a glass sheet according to claim 1, wherein the laser light is CO laser light.

4. The method of manufacturing a glass sheet according to claim 1, wherein the laser irradiation step is performed under a condition in which a thermal stress OT (MPa) of the mother glass sheet calculated by the following mathematical expression 1 satisfies the following mathematical expression 2:

$$\sigma_T = \frac{E \cdot \alpha \cdot \Delta T}{2(1-\nu)} \qquad \text{[Math. 1]}$$

where E represents a Young's modulus (MPa) of the mother glass sheet, a represents a thermal expansion coefficient (/K) of the mother glass sheet, v represents a Poisson's ratio of the mother glass sheet, and ΔT represents a difference between a temperature (K) at an irradiation position of the laser light with respect to the mother glass sheet and a temperature (K) at a position away from the irradiation position; and $$40+60t \leq \sigma_1 \leq 90+60t \qquad \text{[Math. 2]}$$

where "t" represents a thickness (mm) of the mother glass sheet.

* * * * *